(12) United States Patent
Misaki et al.

(10) Patent No.: US 11,315,148 B2
(45) Date of Patent: Apr. 26, 2022

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Masahiro Misaki, Nagoya (JP); Orie Mitsuhashi, Kasugai (JP); Masahiro Ueda, Nisshin (JP); Yoshitaka Atsumi, Toyota (JP); Naoto Sasagawa, Nishio (JP); Naoki Yamamuro, Nagoya (JP); Chiho Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/597,092

(22) Filed: Oct. 9, 2019

(65) Prior Publication Data

US 2020/0111127 A1    Apr. 9, 2020

(30) Foreign Application Priority Data

Oct. 9, 2018    (JP) .............................. JP2018-191110

(51) Int. Cl.
| | | |
|---|---|---|
| *G06Q 30/00* | (2012.01) | |
| *G06Q 30/02* | (2012.01) | |
| *H04W 4/021* | (2018.01) | |
| *H04N 1/00* | (2006.01) | |

(52) U.S. Cl.
CPC ..... *G06Q 30/0266* (2013.01); *G06Q 30/0207* (2013.01); *G06Q 30/0259* (2013.01); *G06Q 30/0261* (2013.01); *H04N 1/00416* (2013.01); *H04W 4/021* (2013.01)

(58) Field of Classification Search
CPC ............ H04W 1/00416; H04W 4/021; H04N 1/00416
See application file for complete search history.

(56) References Cited

U.S. PATENT DOCUMENTS

| | | | |
|---|---|---|---|
| 2017/0200197 A1* | 7/2017 | Brubaker | ........... G06Q 30/0275 |
| 2019/0286126 A1* | 9/2019 | Williams | ............. G05D 1/0088 |
| 2020/0174261 A1* | 6/2020 | Uenohara | .......... G02B 27/0179 |
| 2020/0250696 A1* | 8/2020 | Cordell | ................ G07C 5/0841 |

FOREIGN PATENT DOCUMENTS

| | | |
|---|---|---|
| JP | 2004-239650 A | 8/2004 |
| JP | 2008-003980 A | 1/2008 |
| JP | 2009-122034 A | 6/2009 |
| JP | 2014-206857 A | 10/2014 |

\* cited by examiner

*Primary Examiner* — Alvin L Brown
(74) *Attorney, Agent, or Firm* — Oliff PLC

(57) ABSTRACT

An information processing apparatus extracts at least one store from a plurality of stores in accordance with an order in which degrees of safety for a target vehicle are ordered as starting from higher degrees of safety, by using information which indicates the degree of safety relevant to situations to be provided if a user visits the store and the user leaves the store by using the vehicle with respect to each of the plurality of stores belonging to a predetermined category; and provides, to the user who gets on the target vehicle, information which prompts the user to visit the at least one store.

7 Claims, 17 Drawing Sheets

STORE DB

| STORE | PROFILE | STORE VISIT PROMOTING INFORMATION | LOCATIONAL CONDITION | DEGREE OF SAFETY (REFERENCE VALUE) |
|---|---|---|---|---|
| A | | | DIFFERENCE IN LEVEL | 90 |
| B | | | NARROW ENTRANCE | 80 |
| C | | | DIFFICULT TO LEAVE STORE | 50 |
| D | | | | 100 |

Fig. 6

| USER DB | | | | | |
|---|---|---|---|---|---|
| USER | PROFILE | POSITION·DIRECTION | DESIRED CATEGORY | STORE VISIT CONDITION | USER CORRECTION VALUE |
| U1 | | | | | |
| U2 | | | | | |
| U3 | | | | | |
| ... | ... | ... | ... | ... | ... |

Fig. 7

NG CONDITION-CORRECTION VALUE CONVERSION TABLE

| STORE VISIT NG CONDITION | USER CORRECTION VALUE |
|---|---|
| CONDITION 1 | −10 |
| CONDITION 2 | −20 |
| CONDITION 3 | −30 |
| CONDITION 4 | −50 |
| ⋮ | ⋮ |

Fig. 8

TRAVELING CONDITION-CORRECTION VALUE CONVERSION TABLE

| STORE | RELATIVE POSITION WITH RESPECT TO VEHICLE | TRAVELING CONDITION CORRECTION VALUE |
|---|---|---|
| A | CRUISING LANE SIDE | |
| B | OPPOSITE LANE SIDE | -50 |
| C | OPPOSITE LANE SIDE | -20 |
| D | CRUISING LANE SIDE | |
| ⋮ | ⋮ | ⋮ |

Fig. 9

TRAVELING CONDITION-CORRECTION VALUE CONVERSION TABLE

| STORE | RELATIVE POSITION WITH RESPECT TO VEHICLE | TRAVELING CONDITION CORRECTION VALUE |
|---|---|---|
| A | OPPOSITE LANE SIDE | -50 |
| B | OPPOSITE LANE SIDE | -20 |
| C | CRUISING LANE SIDE | |
| D | CRUISING LANE SIDE | |
| ... | ... | ... |

Fig. 10

DEGREE OF SAFETY TABLE

| STORE | DEGREE OF SAFETY (REFERENCE VALUE) | USER CORRECTION VALUE | TRAVELING CONDITION CORRECTION VALUE | DEGREE OF SAFETY (AFTER CORRECTION) |
|---|---|---|---|---|
| A | 90 | -50 | | 40 |
| B | 80 | | -50 | 30 |
| C | 50 | | -20 | 20 |
| D | 100 | | | 100 |

Fig. 11

INFORMATION PROCESSING APPARATUS, INFORMATION PROCESSING METHOD, AND NON-TRANSITORY STORAGE MEDIUM

CROSS REFERENCE TO THE RELATED APPLICATION

This application claims the benefit of Japanese Patent Application No. 2018-191110, filed on Oct. 9, 2018, which is hereby incorporated by reference herein in its entirety.

BACKGROUND

Technical Field

The present disclosure relates to an information processing apparatus, an information processing method, and a non-transitory storage medium.

Description of the Related Art

Conventionally, an image forming apparatus is installed in a service area of a highway (expressway) such that the image forming apparatus acquires the situation data which indicates the congestion situations (statuses of congestion) of a plurality of stores (shops) in the service area, the degrees of congestion of the respective stores are calculated, and a coupon is issued so that a user is guided to a store which is included in the plurality of stores and which has easiness of utilization that is relatively high (see, for example, Patent Literature 1).

PRIOR ART LITERATURE

Patent Literature

Patent Literature 1: Japanese Patent Application Laid-Open No. 2014-206857

SUMMARY

An object of the present disclosure is to provide an information processing apparatus, an information processing method, and a non-transitory storage medium stored with a program which make it possible to provide information about stores to a user of a vehicle while considering the safety when the user visits the stores and/or when the user leaves the stores.

A first aspect of the present disclosure may reside in an information processing apparatus. The information processing apparatus may comprise a controller comprising at least one processor configured to execute extraction of at least one store from a plurality of stores in accordance with an order in which degrees of safety for a target vehicle are ordered as starting from higher degrees of safety, by using information which indicates the degree of safety relevant to situations to be provided if a user visits the store and the user leaves the store by using the vehicle with respect to each of the plurality of stores belonging to a predetermined category; and provision, to the user who gets on the target vehicle, of information which prompts the user to visit the at least one store.

A second aspect of the present disclosure may reside in an information processing method. The information processing method may comprise allowing an information processing apparatus to extract at least one store from a plurality of stores in accordance with an order in which degrees of safety for a target vehicle are ordered as starting from higher degrees of safety, by using information which indicates the degree of safety relevant to situations to be provided if a user visits the store and the user leaves the store by using the vehicle with respect to each of the plurality of stores belonging to a predetermined category; and provide, to the user who gets on the target vehicle, information which prompts the user to visit the at least one store.

A third aspect of the present disclosure may reside in a non-transitory storage medium stored with a program. The program, which is stored on the non-transitory storage medium, allows a computer to execute a step of extracting at least one store from a plurality of stores in accordance with an order in which degrees of safety for a target vehicle are ordered as starting from higher degrees of safety, by using information which indicates the degree of safety relevant to situations to be provided if a user visits the store and the user leaves the store by using the vehicle with respect to each of the plurality of stores belonging to a predetermined category; and a step of providing, to the user who gets on the target vehicle, information which prompts the user to visit the at least one store.

According to the present disclosure, it is possible to provide information about stores to a user of a vehicle while considering the safety when the user visits the stores and/or when the user leaves the stores.

BRIEF DESCRIPTION OF THE DRAWINGS

FIG. 6 shows an exemplary data structure of a store database (store DB).

FIG. 7 shows an exemplary data structure of a user database (user DB).

FIG. 8 shows an exemplary data structure of an NG condition-correction value conversion table.

FIG. 9 shows an exemplary data structure of a traveling condition-correction value conversion table.

FIG. 10 shows an exemplary data structure of a traveling condition-correction value conversion table.

FIG. 11 shows an exemplary data structure of a degree of safety table.

DESCRIPTION OF THE EMBODIMENTS

Figure 1:
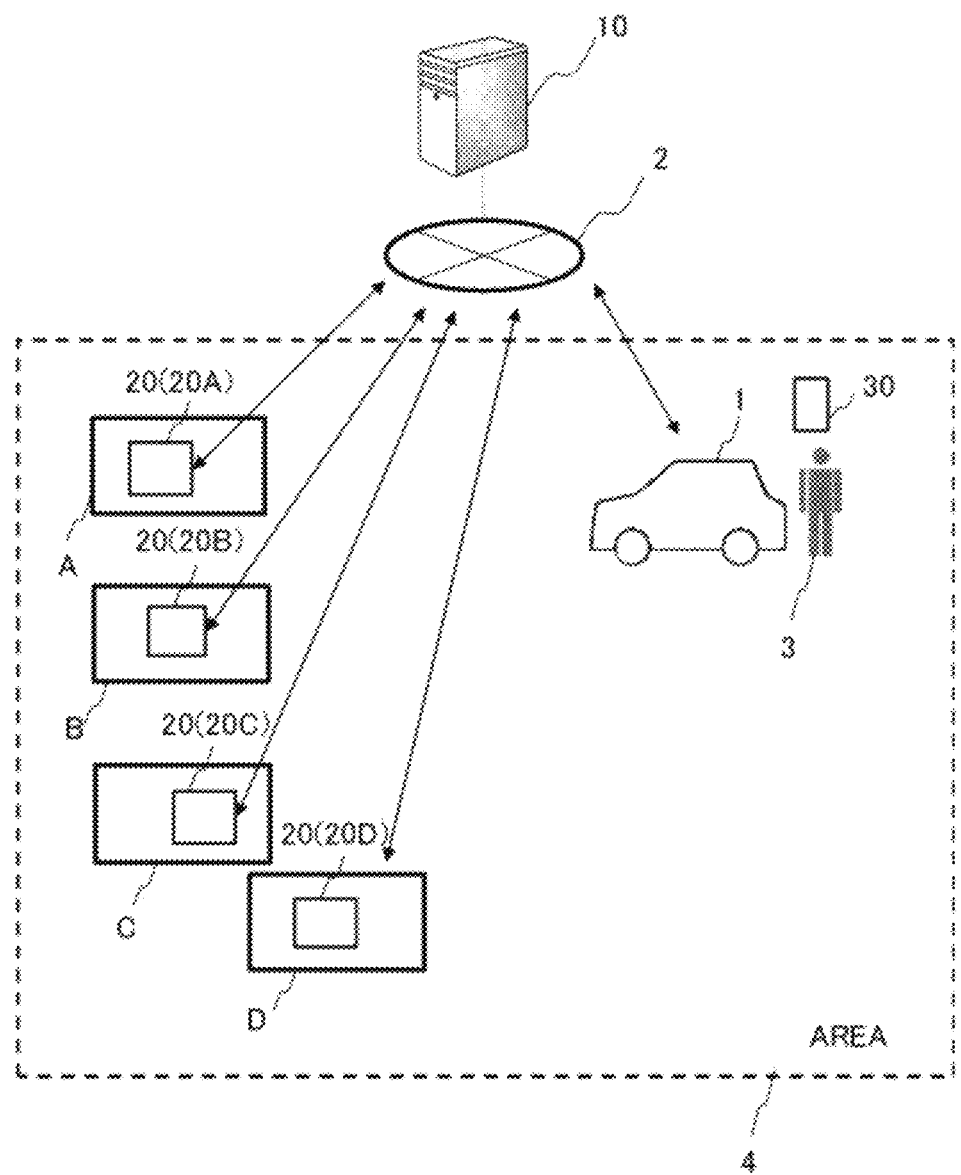
FIG. 1 shows exemplary configuration of an information processing system.

It is conceived that an advertisement and/or a coupon of a concerning store is/are delivered to a user of a vehicle which travels in a predetermined geographical range, while expecting that the user may stop at the store existing in the range on the way to a destination. In this case, if there are a plurality of stores which deal with an identical merchandise or an identical service, it is conceived that a store, which is located nearest to the position of the vehicle, is extracted to deliver an advertisement and/or a coupon of the store. Alternatively, it is considered that a store, which issues a coupon that provides the highest discount rate and/or the highest discount amount of money, is extracted.

However, if there are circumstances, for example, such that the extracted store is located on the opposite lane side, a large difference in level exists between the road and the store, and/or it is difficult to go out into the road from the store because the traffic is always heavy in volume, then it is not necessarily affirmed that the extracted store is optimum in view of the safety. In the embodiment, an explanation will be made about an information processing apparatus, an information processing method, and a program which make it possible to provide the information about the store to a user of a vehicle while taking the safety into consideration when the user visits the store and when the user leaves the store.

In the information processing apparatus according to the embodiment, a controller may extract at least one store from a plurality of stores in accordance with an order in which degrees of safety for a target vehicle are ordered as starting from higher degrees of safety, by using information which indicates the degree of safety relevant to situations to be provided if a user visits the store and the user leaves the store by using the vehicle with respect to each of the plurality of stores belonging to a predetermined category. A controller may transmit, to the terminal of the user of the target vehicle, information which prompts the user to visit the at least one store. Accordingly, it is possible to provide, to the user of the target vehicle, the information of the store in consideration of the safety when the user visits the store and the user leaves the store.

In this context, the predetermined category is determined, for example, in view of the type of the store and the classification of the merchandise and the service to be dealt with, i.e., from such viewpoints that the user can purchase the merchandise of an identical type and/or the user can enjoy the service of an identical type. However, the category may be classified in accordance with any viewpoint other than the above, provided that the user can recognize that a plurality of stores belong to an identical category. The phrase "visits the store" (store visit) means that the user (customer) visits the store, and the phrase "leaves the store" (store leaving) means that the user (customer) leaves or withdraws from the store.

The information, which indicates the degree of safety, may indicate, for example, at least one of a degree of safety of movement from a road to a parking place when the user visits the store and a degree of safety of movement from the parking place to the road when the user leaves the store, in relation to each of the plurality of stores. The degree of safety may be represented by a score (evaluation point) which is applied on the basis of viewpoints in view of the safety including, for example, "there is a difference in level between the road and the store (parking place)", "entrance to the parking place is narrow", "store is hardly seen from the road", "store is located near to an intersection, and hence it is difficult to enter and exit the store", "store faces a narrow alley", and "there is a wide sidewalk (many walker walks thereon) between the parking place and the roadway". It is possible to make judgment such that the larger (smaller) the score is, the higher (lower) the degree of safety is. Further, the degree of safety may be also decided while considering the position and the traveling direction of the target vehicle, for example, considering the fact that "store is located on the opposite lane".

The target vehicle may be a vehicle existing in a predetermined geographical range (region). The predetermined range is the predetermined geographical range. The "plurality of stores" may be selected merely on condition that the stores exist in the "predetermined range". Alternatively, a plurality of stores, which exist in front of the target vehicle, may be selected (stores existing at the back of the target vehicle may be excluded), while considering the position and the traveling direction of the target vehicle existing in the predetermined range. The selection of the stores may be performed, for example, by a controller. However, the selection may be performed by other than the controller.

An explanation about the information processing apparatus and the information processing method according to the embodiment of the present disclosure will be made below by using the drawings. The configuration of the embodiment is described by way of example. The present disclosure is not limited to the configuration of the embodiment.

<System Configuration>

FIG. 1 shows exemplary configuration of an information processing system. With reference to FIG. 1, the information processing system includes a server 10 (example of the "information processing apparatus"), a plurality of store terminals 20, and a user terminal 30 (example of the "user terminal").

The server 10, the plurality of store terminals 20, and the user terminal 30 can make communication via a network 2 to transmit/receive the data respectively. The network 2 includes, for example, WAN (Wide Area Network) which is a worldwide public communication network such as the internet or the like, and an access network to access WAN. However, it is also allowable to adopt any communication network other than WAN. The access network may be either a wired network (for example, LAN) or a wireless network. The wireless network is, for example, a wireless network which is adapted to or based on a predetermined wireless communication standard (Radio Access Technology (RAT)). The wireless communication standard (RAT) is, for example, the cellular communication standard such as 3G, LTE (Long Term Evolution), and 5G, wireless LAN (including IEEE 802.11 series and WiFi), Bluetooth (registered trademark), BLE (Bluetooth (registered trademark) Low Energy), or CV2X (Cellular Vehicle-to-Everything).

The store terminal 20 transmits the information relevant to the store to the server 10 via the network 2. The server 10 can transmit the information relevant to the store to the user terminal 30 of a user 3 who gets on the vehicle 1 (example of "target vehicle") via the network 2.

The store terminal 20 is a communication terminal which is used, for example, by an employee of the store. For example, the store terminal 20 is used to transmit the information relevant to the store to the server 10. In the example shown in FIG. 1, a store A, a store B, a store C, and a store D, which belong to an identical category, are located in a certain geographical area 4 (example of "predetermined geographical range (region)". The store terminal 20A is used in the store A, the store terminal 20B is used in the store B, the store terminal 20C is used in the store C, and the store terminal 20D is used in the store D. The area 4 may be defined by comparting a region into quadrangles, hexagons, or octagons. Alternatively, the area 4 may be defined to have a circular shape about the center of a certain point.

The store is a store which can be accessed by the user 3 by using the vehicle 1. Any classification is available without causing any problem in relation to the merchandise and/or the service dealt with by the store. However, it may be that the merchandise or the service, which is dealt with by the store, is a merchandise or a service which evokes such an impression that the user 3, who is traveling to a destination by using the vehicle 1, favorably stops at the store on the way to the destination if the user 3 receives the information relevant to the store.

The category of the store is classified depending on, for example, the business category (for example, convenience store, gasoline station, supermarket, DIY store, restaurant, and bookstore) and/or the classification of the merchandise and the service to be dealt with. Alternatively, member stores, which participate in an identical franchise system, are included in one category in some cases. The classification method, which is used when the category is decided, can be appropriately selected provided that the user 3 can put a plurality of stores in the same class (user 3 can recognize the plurality of stores as choices or options respectively). In this embodiment, the stores A to D are the stores of the same type. The user 3 can purchase the same merchandise or enjoy the same service in any one of the stores A to D.

However, the degree of safety (degree of difficulty), which is provided when the user visits the stores A to D or when the user leaves the stores A to D by using the vehicle 1, differs depending on, for example, the locational condition. The locational condition is the condition provided by the land on which the store is located. The locational condition includes, for example, the topography, the weather, the traffic, and the relationship with surrounding cities. Specifically, the locational condition includes, for example, "there is a large difference in level between the road (roadway) and the store", "there is a wide sidewalk (many walker walks thereon) between the road (roadway) and the store", "store is located in the middle of a slope", "store is located on an alley", "guardrails, which are provided at a place curving toward the store, have narrow intervals", "road, which is used when the user visits the store and when the user leaves the store, is a main road having a large traffic volume", "store is located near to an intersection", and "there are large traffic volumes of motorized bicycles and light vehicles". Further, the locational condition also includes the environment of the store based on the locational condition. For example, the locational condition includes such an environment that "site is surrounded by fences on account of various reasons, and the entrance/exit is narrow".

The information relevant to the store, which is transmitted from the store terminal 20, includes the information which prompts the user to visit the store (referred to as "store visit promoting information") as well as the information which presents the profile of the store including, for example, the position (address) of the store, the store name, and the merchandise and the service as the dealing objects. The store visit promoting information is, for example, an advertisement of the merchandise and the service dealt with in the store, a coupon which is usable in the store, and an introductory article which presents, for example, an advantage of the store utilization.

The user terminal 30 is a communication terminal possessed by the user 3 who joins the service to accept the store visit promoting information from the server 10. For example, the user terminal 30 is used to register the information relevant to the user 3 in the server 10. The information relevant to the user 3 includes the personal information of the user and the information which indicates the avoidance by the user relevant to the store visit and the store leaving. The avoidance by the user relevant to the store visit and the store leaving represents that the user dislikes and avoids the store visit and the store leaving. The avoidance indicates, for example, the locational condition of the store avoided by the user in view of the safety, for example, such that "there is a difference in level between the road and the store", and "store is located on the opposite lane side". Further, the user terminal 30 transmits the position of the user terminal 30 (i.e., the vehicle 1) which is traveling by using the vehicle 1 at an appropriate timing to the server 10. In this case, if the destination of the user is set, the user terminal 30 can transmit the information which indicates the destination, to the server 10. The information, which indicates the position and the destination of the vehicle 1, may be acquired by the user terminal 30 from a car navigation apparatus 108 provided for the vehicle 1, and the information may be transmitted to the server 10.

The server 10 stores and manages the information (including the store visit promoting information) relevant to the store as received from the plurality of store terminals 20A to 20D. However, the route to acquire the store visit promoting information may be any route including those other than the store terminals 20A to 20D. Further, the server 10 manages the information which indicates the degrees of safety of the stores A to D respectively. The degree of safety is determined on the basis of the locational condition of each of the plurality of stores A to D. That is, the degree of safety is represented by a score (evaluation point) which is obtained by evaluating the specified locational condition of each of the stores A to D in view of the safety (degree of difficulty to visit the store and leave the store by using the vehicle 1). The server 10 may store the correlation between the locational condition and the corresponding score of the safety in relation to the stores A to D, or the server 10 may store only the score of the safety.

The server 10 transmits the store visit promoting information of at least one store as extracted in accordance with an order in which the stores A to D are ordered as starting from those having higher degrees of safety on the basis of the degrees of safety of the stores A to D, to the user terminal 30 via the network 2 with respect to the user terminal 30 of the vehicle 1 which enters the area 4 (exists in the area 4). Accordingly, the store visit promoting information is provided to the user 3. In this embodiment, the store visit promoting information of the store having the highest degree of safety of the plurality of stores A to D is transmitted by the server 10 to the user terminal 30.

The user terminal 30 is, for example, a small-sized computer (having the portability). The user terminal 30 includes, for example, a smartphone, a tablet computer, a mobile computer, a wearable computer, a wireless storage, a feature phone, a handy terminal, and a laptop type personal computer. The user terminal 30 may be either a general purpose computer or an exclusive computer. Further, the user terminal 30 may be a vehicle onboard terminal in some cases. The user terminal 30 as the vehicle onboard terminal may be fixed to (built in) the vehicle 1, or the user terminal 30 as the vehicle onboard terminal may be detachably attached to the vehicle 1 so that the user terminal 30 can be carried to the outside of the vehicle, if necessary. Alternatively, the user terminal 30 as the vehicle onboard terminal may be a computer having the portability which is simply placed at a predetermined position at the inside of the vehicle 1.

Note that the store terminal 20 may be either a general purpose computer or an exclusive computer. Further, the store terminal 20 may be either a mobile terminal or a fixed terminal. Any computer of the type as referred to as the examples of the user terminal 30 can be applied to the store terminal 20.

<Configuration of Server>

Figure 2A:
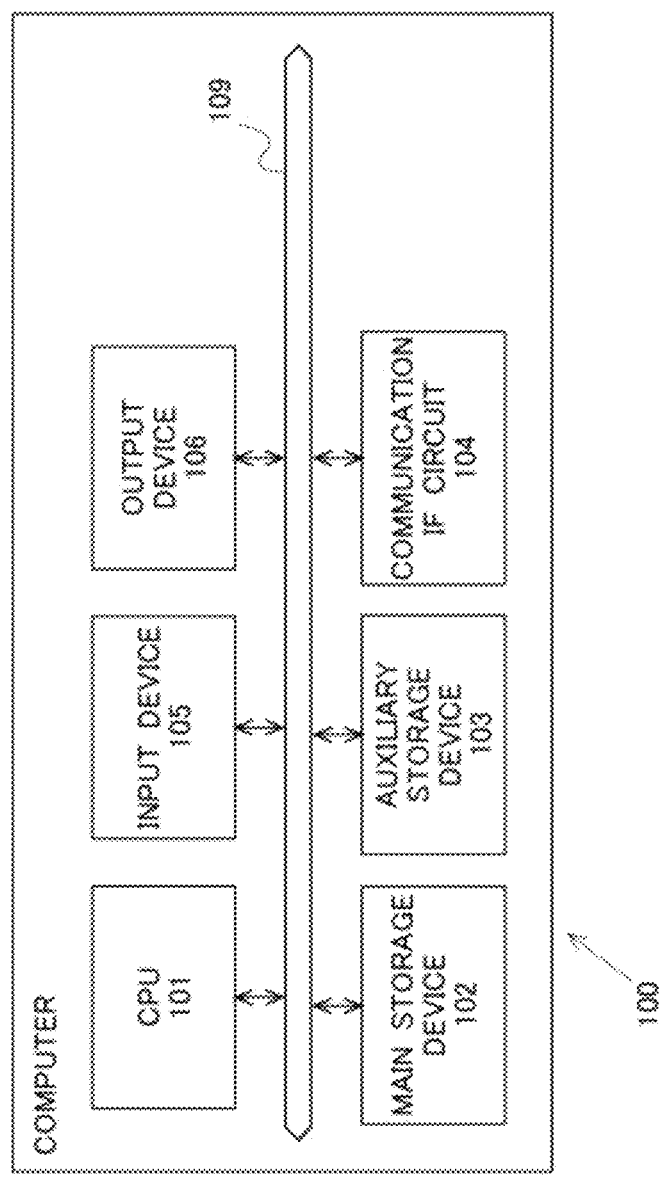
FIG. 2A shows exemplary configuration of a computer which is applicable to a server.
Figure 2B:
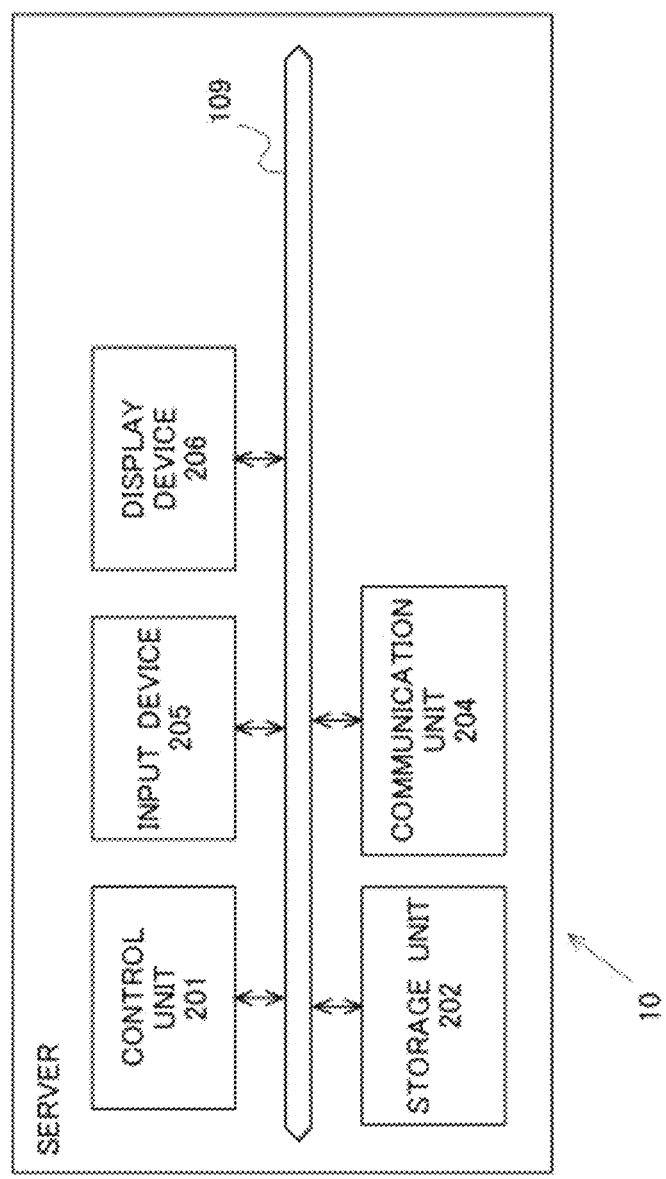
FIG. 2B shows exemplary configuration of the server.

FIG. 2A shows exemplary configuration of a computer 100 which is applicable to the server 10. FIG. 2B shows exemplary configuration of the server 10. With reference to FIG. 2A, the computer 100 includes CPU (Central Processing Unit) 101, a main storage device 102, an auxiliary storage device 103, a communication interface circuit (communication IF circuit) 104, an input device 105, and an output device 106 which are connected to one another by the aid of a bus 109. CPU 101 is an example of the processor, and the main storage device 102 and the auxiliary storage device 103 are examples of the storage device.

The main storage device 102 includes RAM (Random Access Memory) and ROM (Read Only Memory). RAM is used, for example, as a developing area for the program, a working area for CPU 101, and a data storage area. ROM stores various programs to be executed by CPU 101 and data to be used when the programs are executed. The auxiliary storage device 103, for example, the program and the data to be used when the program is executed. The auxiliary storage device 103 is, for example, a hard disk drive (HDD) or SSD (Solid State Drive). The auxiliary storage device 103 may be, for example, EPROM or a removable medium. The removable medium is, for example, a flash memory such as a USB memory, an SD card or the like, or a disk recording medium such as CD-ROM, DVD disk, or Blu-ray Disc.

The communication IF circuit 104 is the circuit which manages the communication process in accordance with a predetermined communication standard (of the network 2). The communication IF circuit 104 performs, for example, the transmission/reception of the signal and the protocol conversion process. The input device 105 is, for example, a key, a button, a pointing device, and/or a touch panel to be used to input the information. Further, the output device 106 is used to output the information. The output device 106 includes, for example, a display device and a printer. Further, the input device 105 includes a voice input device such as a microphone in some cases. The output device 106 includes a voice output device such as a speaker in some cases. For example, a head set may be used as a voice input and output device.

CPU 101 performs various processes by loading and executing the programs stored in the main storage device 102 and the auxiliary storage device 103. The computer 100 operates as the server 10 including a control unit 201, a storage unit 202, a communication unit 204, an input device 205, and a display device 206 which are connected to one another by the aid of a bus 109 as shown in FIG. 2B, in accordance with the execution of the program by CPU 101. Addresses of the devices with which the communication is made are mutually known in the communication between the server 10 and the store terminal 20 and the communication between the server 10 and the user terminal 30.

CPU 101 operates as the control unit 201. The main storage device 102 and the auxiliary storage device 103 are used as the storage unit 202. The communication IF circuit 104 operates as the communication unit 204 (FIG. 2B), and the input device 105 and the output device 106 are used as the input device 205 and the display device 206.

The control unit 201 performs the operation and the process, for example, as follows as the process for providing the store visit promoting information extracted on the basis of the degree of safety, to the user 3 of the vehicle 1.

(a) The information relevant to the store including the store visit promoting information of the stores A to D, which is received by the communication unit 204 from the store terminals 20A to 20D by means of the communication with the store terminals 20A to 20D, is acquired, and the information is stored in the storage unit 202.

(b) The information, which indicates the position of the user terminal 30, is periodically received from the user terminal 30. If the position of the user terminal 30 (i.e., the vehicle 1) enters the area 4, the store, which is included in the stores A to D and which has the highest degree of safety, is extracted on the basis of the information which indicates the degrees of safety in relation to the stores A to D. The information, which indicates the degree of safety, may be previously stored in the storage unit 202 (main storage device 102 or auxiliary storage device 103), or the information may be acquired from a predetermined device or apparatus via the network 2.

(c) The store visit promoting information of the extracted store is transmitted from the communication unit 204 via the network 2 to the user terminal 30.

Note that all of or parts of the operation and the process to be performed by the server 10 may be realized by any hardware circuit such as ASIC (Application Specific Integrated Circuit) and FPGA (Field Programmable Gate Array). Further, it is not necessarily indispensable that the server 10 is realized by the single physical configuration. The server 10 may be configured by a plurality of computers which cooperate with each other. The user terminal 30 also has these features in the same manner as described above.

<Configuration of User Terminal>

Figure 3A:
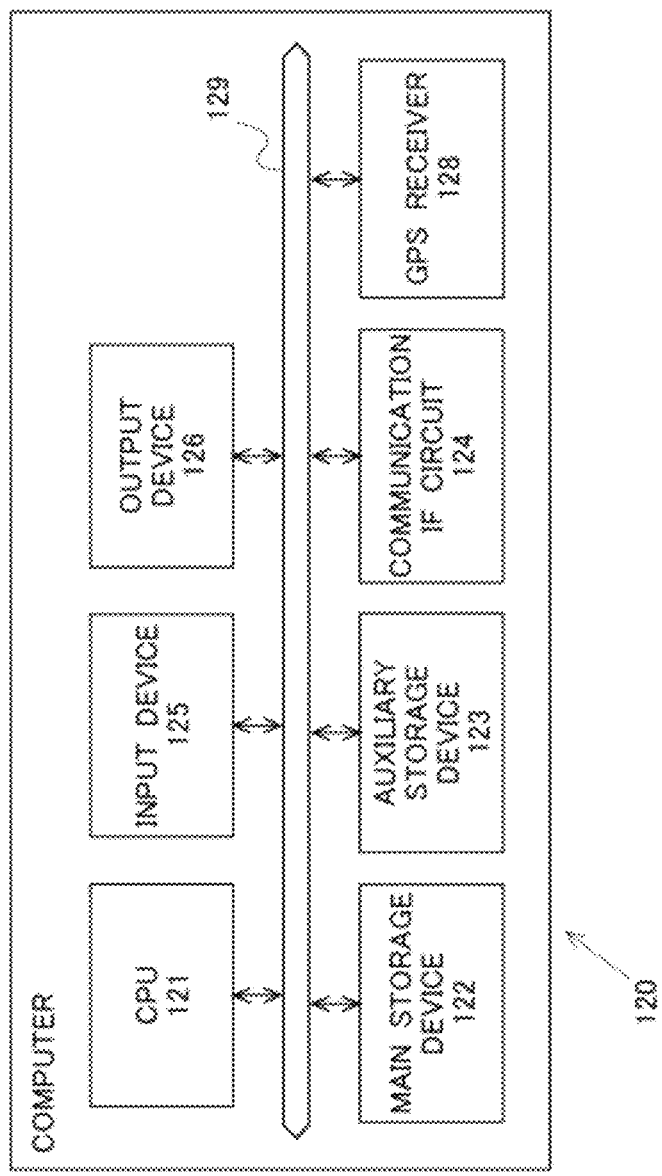
FIG. 3A shows exemplary configuration of a computer which is usable as a user terminal.
Figure 3B:
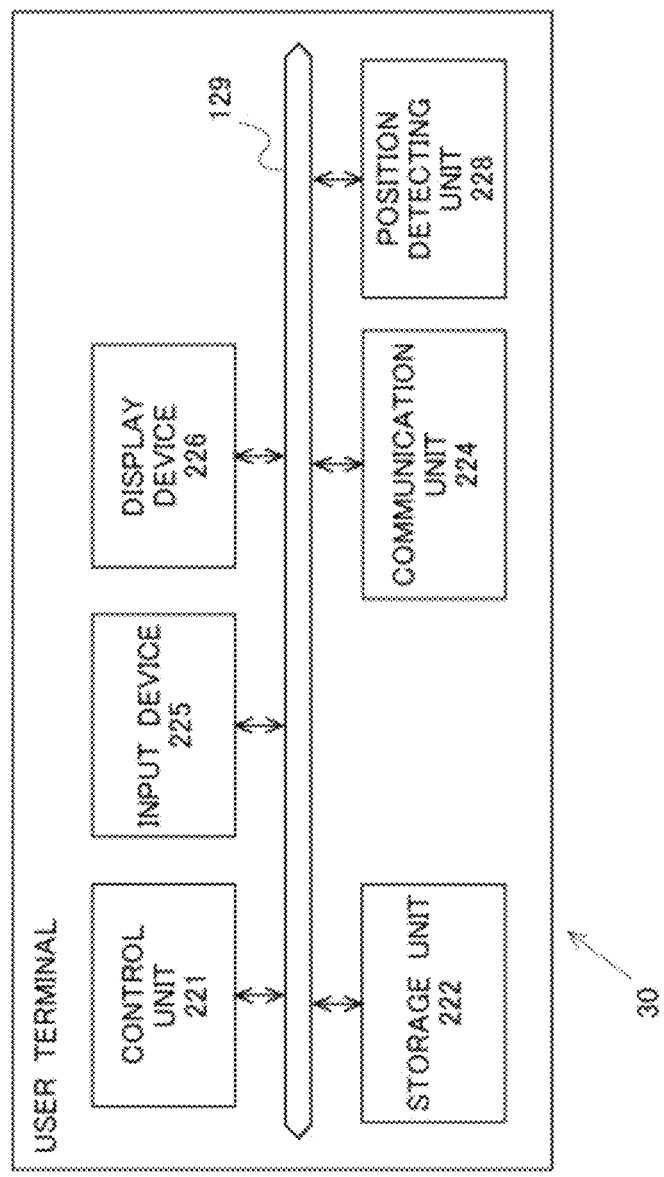
FIG. 3B shows exemplary configuration of the user terminal.

FIG. 3A shows exemplary configuration of a computer 120 which is usable as the user terminal 30. FIG. 3B shows exemplary configuration of the user terminal 30. With reference to FIG. 3A, the computer 120 are configured in the same manner as the computer 100 such that CPU 121, a main storage device 122, an auxiliary storage device 123, a communication IF circuit 124, an input device 125, and an output device 126 are connected to one another by the aid of a bus 129. A GPS (Global Positioning System) receiver 128 is further connected to the bus 129 of the computer 120. The GPS receiver 128 is used to detect the position of the user terminal 30, i.e., the present position of the user 3 (vehicle 1).

In the computer 120 shown in FIG. 3A, CPU 121 executes the programs stored in the main storage device 122 and the auxiliary storage device 123. Accordingly, as shown in FIG. 3B, the computer 120 operates as the user terminal 30 including a control unit 221, a storage unit 222, a communication unit 224, an input device 225, a display device 226, and a position detecting unit 228. That is, CPU 121 operates as the control unit 221. The main storage device 122 and the auxiliary storage device 123 are used as the storage unit 222. Further, the communication IF circuit 124 operates as the communication unit 224. Further, the input device 125 and the output device 126 are used as the input device 225 and the display device 226. Further, the GPS receiver 128 operates as the position detecting unit 228. The user terminal 30 can transmit the information which is relevant to the user 3 inputted by using, for example, the input device 125, the information which indicates the destination, and the position information which is detected by the position detecting unit 228, via the communication unit 224 to the server 10.

Figure 4A:
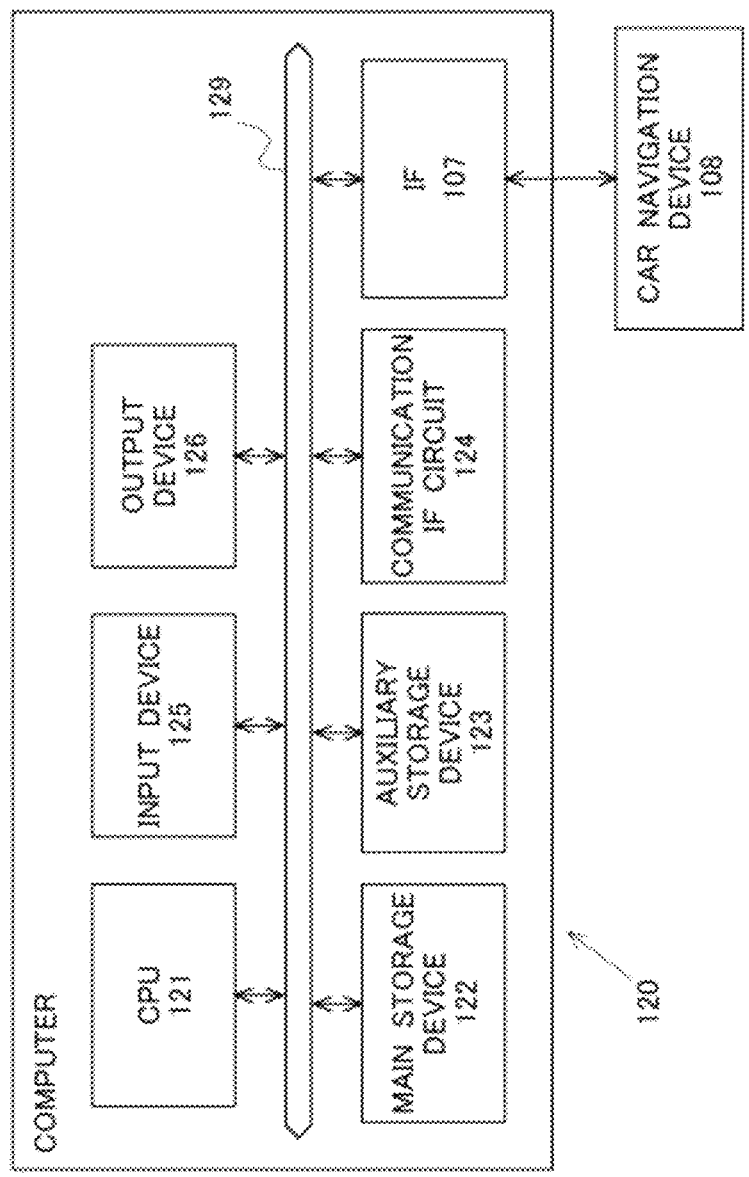
FIGS. 4A and 4B show a modified embodiment of the computer which is usable as the user terminal and the user terminal.
Figure 4B:
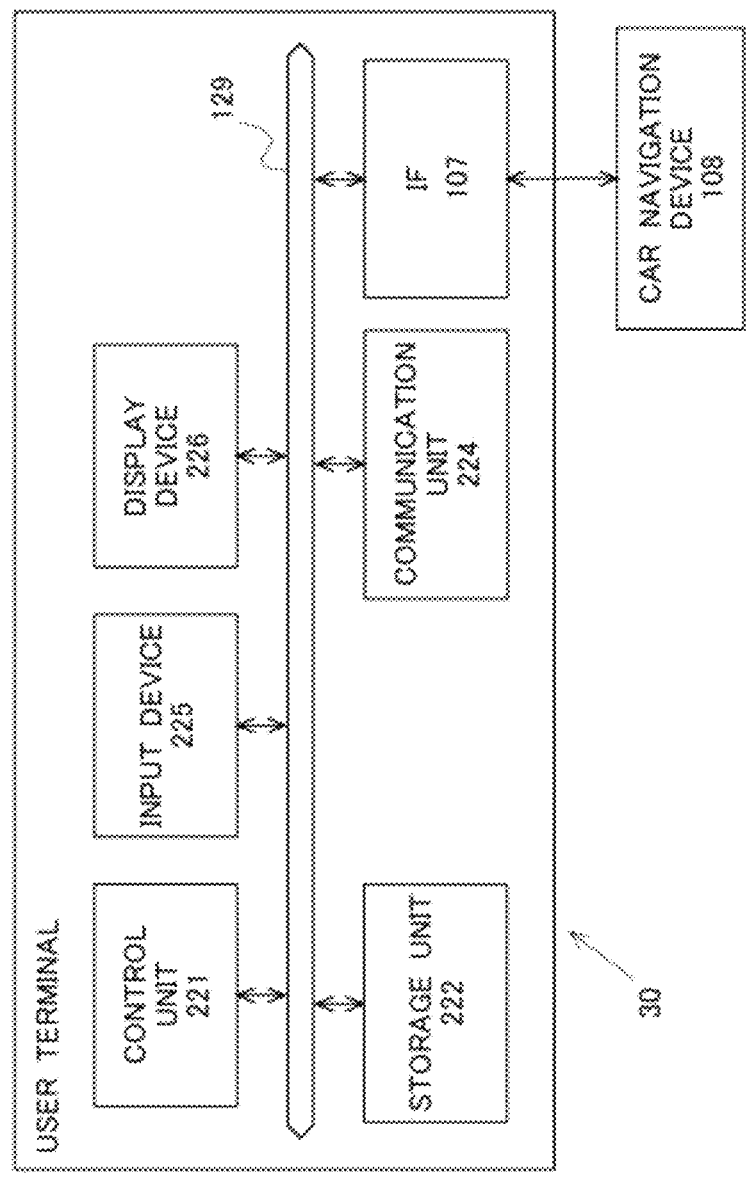

Note that the configuration shown in FIG. 4A and FIG. 4B may be adopted for the configuration of the computer 120 and the user terminal 30 in place of the configuration shown in FIG. 3A and FIG. 3B. In the example shown in FIG. 4A and FIG. 4B, the computer 120 (user terminal 30) is connected via the interface circuit (IF) 107 to the car navigation device 108 carried on the vehicle 1. In this case, the car navigation device 108 includes, for example, CPU (processor), a storage device, a communication device, a GPS receiver, an input device, and a display device. The processor calculates the distance, the route, and the required time until arrival at the destination from the destination information inputted from the input device and the present position obtained from the GPS receiver by executing the program stored in the storage device, and the processor allows the display apparatus to display the map including the position of the vehicle 1. Further, together with the above, the car navigation device 108 displays, for example, the distance, the route, and the required time until arrival at the destination. The user terminal 30 may acquire the appropriate information including, for example, the position information and the destination information as obtained by the car navigation device 108, and the information may be transmitted to the server 10.

<Exemplary Operation>

Figure 5:
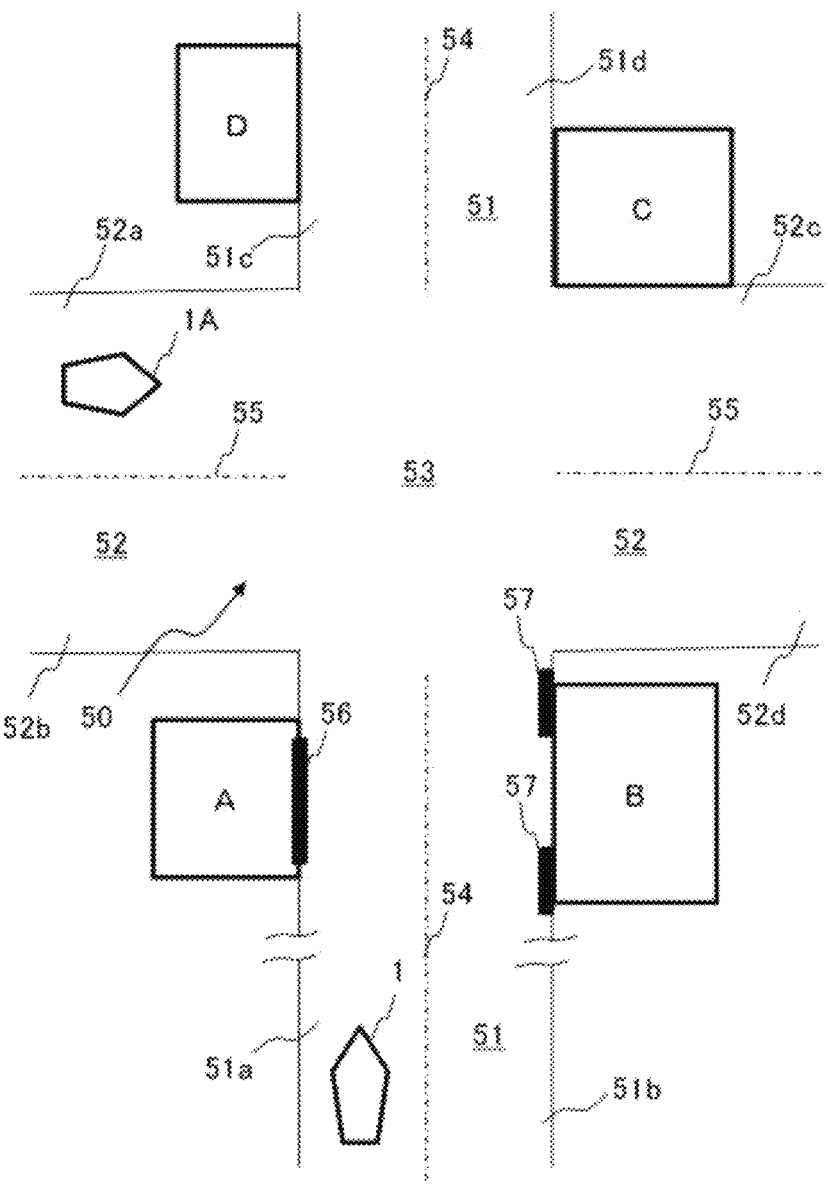
FIG. 5 explains a situation concerning an exemplary operation.

Next, an explanation will be made about the operation or the process (information processing method) of the information processing apparatus (server 10) according to the embodiment. FIG. 5 explains a situation concerning an exemplary operation. There is a crossroad 50 in which a straight road 51 and a straight road 52 intersect at an intersection 53 in the area 4 shown in FIG. 1. Each of the road 51 and the road 52 is a bidirectional roadway on which median strips 54, 55 are drawn on the road surface. With reference to FIG. 5, the road 51 includes a lane 51*a* which is located on the lower side and the left side of the intersection 53, a lane 51*b* which is an opposite lane of the lane 51*a*, a lane 51*c* which is located on the upper side and the left side of the intersection 53, and a lane 51*d* which is an opposite lane of the lane 51*c*. Further, the road 52 includes a lane 52*a* which is located on the left side and the upper side of the intersection 53, a lane 52*b* which is an opposite lane of the lane 52*a*, a lane 52*c* which is located on the right side and the upper side of the intersection 53, and a lane 52*d* which is an opposite lane of the lane 52*c*.

The store A and the store D shown in FIG. 1 face the lane 51*a* of the road 51, and the store B faces the lane 51*b*. The store C faces the lane 51*d* of the road 51 and the lane 52*b* of the road 52. The store D faces the lane 51*c* of the road 51.

The vehicle 1, on which the user 3 gets while possessing the user terminal 30, enters the area 4, and the vehicle 1 is traveling on the lane 51*a* of the road 51. The stores A to D are located on the front side of the vehicle 1. The destination of the user getting on the vehicle 1 is located beyond the area 4 through which the vehicle 1 will pass while traveling on the lane 51*c*. The area 4 is merely a point of passage (transit point) for the user 3.

As described above, the store terminals 20A to 20D of the stores A to D transmit the information relevant to the stores A to D respectively to the server 10. In the server 10, the information relevant to the stores A to D respectively, which is received by the communication unit 204, is stored in the storage unit 202 by means of the control unit 201.

FIG. 6 shows an exemplary data structure of a store database (store DB) stored in the storage unit 202. The store DB is generated, for example, for each of the categories. The stores A to D belong to an identical category. The store DB has records (entries) corresponding to the respective stores.

The record includes the identifier of the store (name and/or ID), the profile information described above (for example, store name, address, contact address, dealing merchandise and service, and business category), and the store visit promoting information described above. Further, the record includes the information which indicates the locational condition described above, and the degree of safety (reference value) which corresponds to the locational condition. The reference value of the degree of safety is a value which is obtained, for example, on the basis of a base score (for example, 100 points) such that a negative (minus) circumstance, which is brought about in view of the safety in relation to the visiting to the store and/or the leaving from the store, is converted into a numerical value, and the numerical value is subtracted from the base score.

For example, the store A shown in FIG. 5 has a large difference in level 56 between the store A and the road 51 (lane 51*a*). If the vehicle height of the vehicle 1 is low, there is a possibility that the front end and/or the bottom surface of the vehicle 1 may make contact with the road surface when the user visits the store or when the user leaves the store. The negative (minus) circumstance as described above is converted into a numerical value (for example, −10 points), and the numerical value is subtracted from the base score. Therefore, the reference value of the degree of safety of the store A is 90 points.

On the other hand, when the user visits the store B, it is necessary to pass through the space between guardrails 57, 57. However, the space between the guardrails 57, 57 is narrow. In this situation, the user pays attention to the passage when the user visits the store. The negative (minus) circumstance as described above is converted into a numerical value (for example, −20 points), and the numerical value is subtracted from the base score. Accordingly, the reference value of the degree of safety of the store B is 80 points.

On the other hand, the store C faces the lane 51*d* and the lane 52*c* in an open state. It is easy to visit the store (it is easy to move the vehicle 1 from the road 51 or 52 to the parking place). However, the vehicles, which are scheduled to turn to the left or turn to the right on the road 52 that is the main road, are concentrated on the lane 51*d* to which the store C faces. Therefore, the lane 51*d* has a large traffic volume. The road 52 is the main road, and hence the lane 52*c* also has a large traffic volume. Note that almost all of the vehicles, which enter the intersection from the lane 51*a*, change the courses to the road 52 by turning to the right or the left. Therefore, the lane 51*c* has a small traffic volume.

On account of the circumstance as described above, when the user leaves the store C, it is necessary to launch the vehicle to the road at a short interval between traveling vehicles in order to go out (move) to the road 51 or the road 52 from the parking place of the store C. Therefore, the user (driver) extremely pays attention. The negative (minus) circumstance as described above is converted into a numerical value (for example, −50 points), and the numerical value is subtracted from the base score. The resultant value, which is 50 points, is the reference value of the degree of safety of the store C.

As for the locational condition of the store D, no matter is specifically considered in view of the safety. The base score is the reference value of the degree of safety as it is. According to the above, in this embodiment, the store, which is included in the stores A to D and which has the highest degree of safety on the basis of the locational condition, is the store D.

Note that in this embodiment, the degree of safety, in which the degree of safety of the movement from the road to the parking place provided when the user visits the store and the degree of safety of the movement from the parking place to the road provided when the user leaves the store are integrated, is stored in relation to each of the plurality of stores A to D. However, the degree of safety provided when the user visits the store and the degree of safety provided when the user leaves the store may be individually stored. Further, it is also allowable to adopt such a case that only any one of the degree of safety provided when the user visits the store and the degree of safety provided when the user leaves the store is stored.

FIG. 7 shows an exemplary data structure of a user database (user DB) to be stored in the storage unit 202. The user DB is generated, for example, for each of the users (users U1, U2, U3, . . . ).

The record includes the profile information of the user, the position and the traveling direction of the user terminal 30 (vehicle 1), the desired category, the store visit NG condition, and the user correction value. The profile information is personal information of the user (for example, name and/or ID, address, and contact address). The data, which indicates the position, is the position information of the user terminal 30 or the vehicle 1 as received from the user terminal 30. The traveling direction can be deduced from two or more pieces of position information.

The desired category is the information which indicates the category for which the user desires the provision of the store visit promoting information. The store visit NG condition indicates the condition on which the user avoids the visit to the store. The store visit NG condition corresponds to the information which indicates avoidance by the user who is to visit the store and leave the store. The store visit NG condition is, for example, "existence of the difference in level", "narrow entrance", "difficult to leave the store", and "location on the opposite lane side". The user correction value is the value to be subtracted from the reference value if the store fulfills the store visit NG condition. The user correction value may be decided by the user, or the user correction value may be decided by anyone other than the user. In the example shown in FIG. 7, the user U1 (corresponding to the user 3) sets the "existence of the difference in level" for the store visit NG condition, and the user correction value in this case is set to be "−50".

FIG. 8 shows an exemplary data structure of an NG condition-correction value conversion table. If the user correction value is decided by anyone other than the user, the NG condition-correction value conversion table as shown in FIG. 8 is used. The NG condition-correction value conversion table is stored, for example, in the storage unit 202. The NG condition-correction value conversion table is the table which indicates the correlation between the condition of the store visit NG condition and the user correction value (penalty). If the store visit NG condition is presented by the user, and the user correction value is not presented, then the control unit 201 makes reference to the NG condition-correction value conversion table to read the corresponding user correction value which is set (registered) in the user DB.

FIG. 9 shows an exemplary data structure of a traveling condition-correction value conversion table. The correlation between the relative position between the store and the vehicle and the traveling condition correction value is stored in the traveling condition-correction value conversion table. The traveling condition-correction value conversion table is stored, for example, in the storage unit 202.

The control unit 201 estimates the position and the traveling direction of the vehicle 1 on the basis of the position information received from the user terminal 30. Then, the control unit 201 judges whether each of the stores A to D is located on the left side with respect to the cruising lane side (side of the lanes 51*a*, 51*c*) or on the opposite lane side (side of the lanes 51*b*, 51*d*), from each of the relative positions between the stores A to D and the vehicle 1. If the store is located on the opposite lane side, and it is necessary to traverse the opposite lane when the user visits the store, then −50 is set as the traveling condition correction value (penalty) (see the record of the store B). On the contrary, if the store is located on the opposite lane side, and it is necessary to change the course (lane) while turning to the right when the user visits the store, then −20 is set as the traveling condition correction value (see the record of the store C).

As for the content of the traveling condition-correction value conversion table, the content changes depending on the relative position with respect to the store. For example, it is assumed that the vehicle 1 travels at the position of the vehicle 1A shown in FIG. 5. In this case, as for the content of the traveling condition-correction value conversion table, the store A and the store B are located on the opposite lane side, and the traveling condition correction value is set depending on the traverse or the course change (lane change) caused by the turning to the right. On the contrary, the store C and the store D are located on the cruising lane side. Note that if the vehicle 1 located at the position of the vehicle 1A visits the store D, it is necessary to change the course (lane) while turning to the left. In relation to this fact, it is also allowable to set the traveling condition correction value (for example, −10).

FIG. 11 shows an exemplary data structure of a degree of safety table. The degree of safety table has the record for each of the stores. As for the record, the degree of safety (reference value), the user correction value, the traveling condition correction value, and the degree of safety (after correction) are stored. The degree of safety table is a working table which is used to calculate the degree of safety after the correction for each of the stores. The degree of safety after the correction is the value obtained by subtracting the user correction value and the traveling condition correction value from the reference value of the degree of safety. The reference value of the degree of safety may be used for the extraction of the store. However, the use of the reference value after the correction may also be used for the extraction of the store, because the degree of safety is obtained while considering the improvement in the safety. Such a situation is also allowable that only one of the user correction value and the traveling condition correction value is used for the reference value after the correction. Note that the correction, in which the user correction value and/or the traveling condition correction value is/are used, is an option. Further, the score of the degree of safety may be converted into an evaluation value to be classified into several grades (for example, five grades). Further, in this embodiment, the degree of safety is determined in accordance with the subtraction system. However, the degree of safety may be determined in accordance with such a form or system that added points, which relate to matters of point addition such as "there is no difference in level", "entrance is not narrow" and the like, are accumulated.

Figure 12:
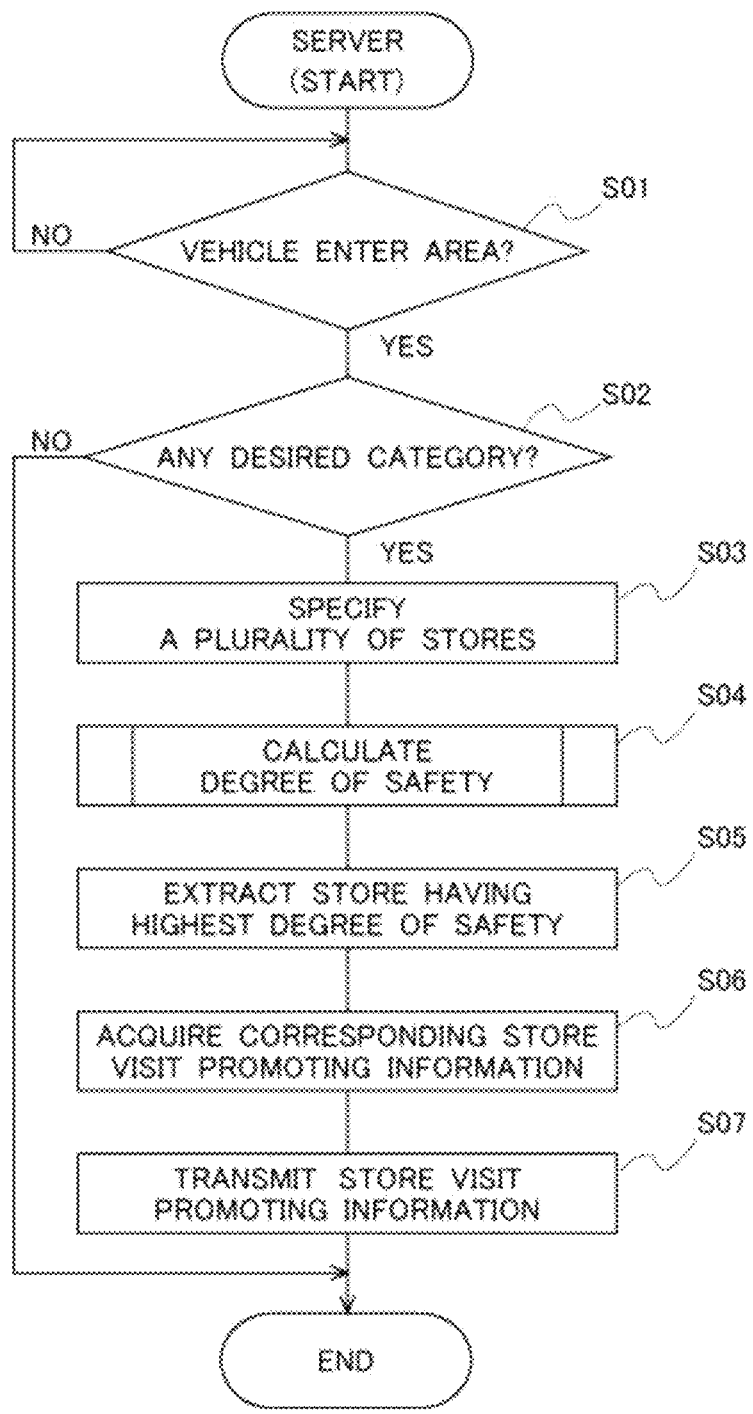
FIG. 12 shows a flow chart illustrating an exemplary process performed by a control unit of the server.

FIG. 12 shows a flow chart illustrating an exemplary process performed by the control unit 201 of the server 10. In S01 shown in FIG. 12, the control unit 201 judges whether or not the vehicle 1, on which the user 3 having the user terminal 30 gets, enters the area 4 on the basis of the position information received from the user terminal 30.

Note that the control unit 201 updates the information about the position and the traveling direction in the user DB (FIG. 7) every time when the position information is received.

In S01, if it is judged that the vehicle 1 enters the area 4, the control unit 201 makes reference to the user DB (FIG. 7) to retrieve the store DB which conforms to the desire category from the storage unit 202 by making reference to the desired category of the user 3 (S02). If the corresponding store DB is found out as a result the retrieval, the process proceeds to S03. If the corresponding store DB is not found out, the process shown in FIG. 12 is terminated. In this embodiment, as a result of the process of S02, the control unit 201 retrieves the store DB of the category to which the stores A to D belong (FIG. 6) from the storage unit 202.

In S03, the control unit 201 specifies the plurality of stores A to D by making reference to the content of the retrieved store DB. In S04, the control unit 201 calculates the degrees of safety for the stores A to D. In S05, the store having the highest degree of safety is extracted from the stores A to D in accordance with an order in which the degrees of safety are ordered as starting from the higher degrees of safety. For example, if the control unit 201 calculates the values of the degrees of safety after the correction as shown in FIG. 11 as a result of the calculation of the degrees of safety, the store D is selected from the stores A to D. However, it is also allowable to adopt such configuration that two or more stores are extracted in accordance with an order in which the degrees of safety are ordered as starting from the higher degrees of safety.

In S06, the control unit 201 reads the store visit promoting information of the extracted store from the store DB, and the information is transmitted to the user terminal 30 by using the communication unit 204. Accordingly, the store visit promoting information can be provided to the user.

Figure 13:
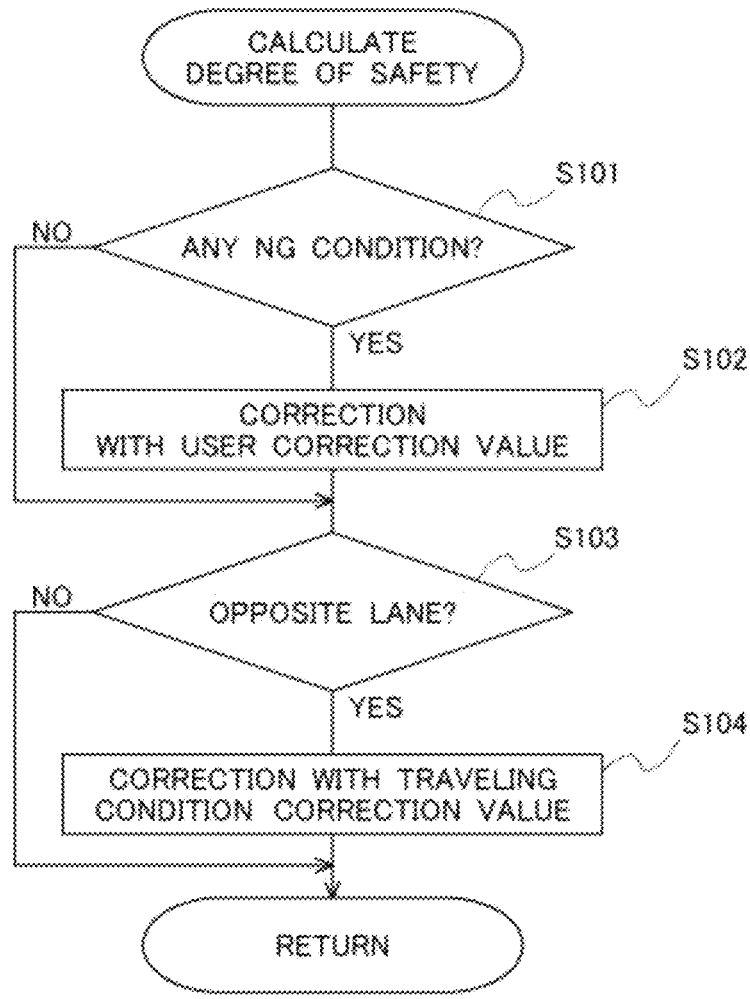
FIG. 13 shows an exemplary process for calculating the degree of safety.

FIG. 13 shows an exemplary subroutine of the process for calculating the degree of safety (S04). The subroutine shown in FIG. 13 is executed for each of the stores. In S101, the control unit 201 reads the store visit NG condition of the user 3 from the user DB to judge whether or not the store fulfils the store visit NG condition. In this case, if the store does not fulfill the store visit NG condition, the process proceeds to S103. If the store fulfills the store visit NG condition, then the control unit 201 acquires the user correction value corresponding to the store visit NG condition from the user DB and subtracts the user correction value from the reference value of the degree of safety of the store (S102), and the process proceeds to S103.

In S103, the control unit 201 generates the traveling condition-correction value conversion table in relation to the vehicle 1 (FIG. 9). If the store falls under the store disposed on the opposite lane side (Yes in S103), the traveling condition correction value is subtracted from the reference value of the degree of safety or the value of the degree of safety corrected in S102 (S104). Accordingly, the value of the degree of safety after the correction is obtained. The control unit 201 terminates the subroutine for calculating the degree of safety, and the process proceeds to S05.

Note that the orders or sequences of the processes of S101 and S102 and the processes of S103 and S104 may be reversed. The processes of S101 and S102 and the processes of S103 and S104 are options. Therefore, any one of them or both of them may be omitted. If both of them are omitted, the reference value of the degree of safety is used to extract the store.

<Function and Effect of Embodiment>

According to the information processing apparatus and the information processing method concerning the embodiment, when the plurality of stores A to D, which belong to the identical category, are present, the store visit promoting information of the store having the highest degree of safety can be provided to the user, without providing any information of the store which is located nearest to the vehicle 1 or the store which has the best discount rate and the best discount amount of money. Accordingly, the user, who gets on the vehicle 1, can stop at the store having the high degree of safety so that the user may purchase the merchandise, the user may receive the provision of the service, and/or the user may utilize the coupon issued, for example, to purchase the merchandise.

Further, in the embodiment, the degree of safety, which is decided on the basis of the locational condition, is corrected by the control unit 201 on the basis of the position and the traveling direction (direction of travel) of the vehicle 1 (S104). At least one store is extracted (selected) on the basis of the corrected degree of safety (S05). Accordingly, the store, which provides the store visit promoting information to the user, is selected from the stores having the high degrees of safety.

Further, in the embodiment, the degree of safety, which is decided on the basis of the locational condition, is corrected by the control unit 201 by using the information (store visit NG condition) which indicates the avoidance relevant to the store visit and the store leaving of the user (S102). At least one store is extracted on the basis of the corrected degree of safety (S05). Accordingly, it is possible to reduce or eliminate the possibility of selection of the store avoided by the user.

Other Embodiments

The embodiments described above are exemplified by way of example in every sense. The present disclosure may be carried out while appropriately making changes within a range without deviating from the gist or essential characteristics thereof.

Figure 14:
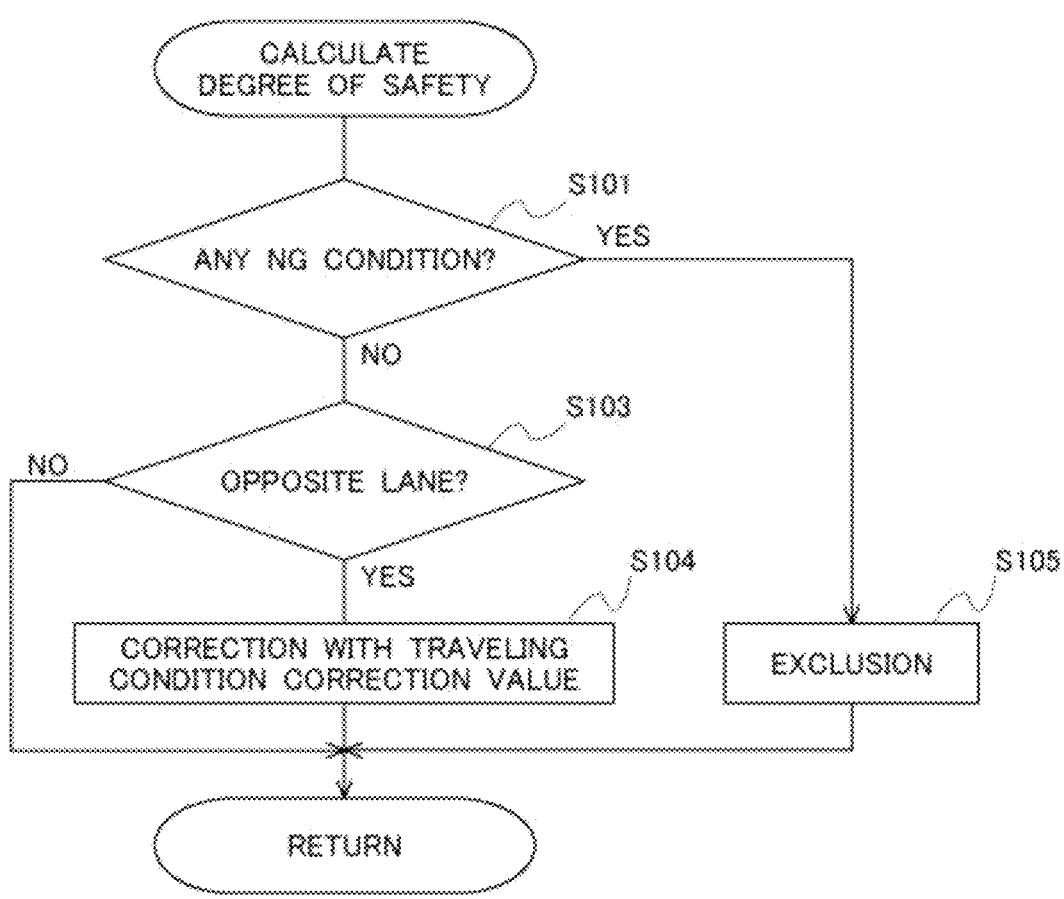
FIG. 14 shows a modified embodiment of the process for calculating the degree of safety.

FIG. 14 shows a modified embodiment of the process for calculating the degree of safety. In the example shown in FIG. 14, the process of S102 shown in FIG. 13 is omitted, and S105 is added. If the store fulfills the store visit NG condition in S101 (Yes in S101), the control unit 201 excludes the store from the stores as the extraction source (S105). The processes of S103 and S104 are the same as the processes shown in FIG. 13. According to the modified embodiment shown in FIG. 14, the store visit promoting information of the store which fulfills the store visit NG condition is reliably prevented from being provided to the user.

The processes and the means explained in this disclosure can be carried out while freely combining them unless any technical contradiction or inconsistency arises.

Further, the process, which has been explained as being performed by one apparatus or device, may be executed by a plurality of apparatuses or devices in a shared manner. Alternatively, the process, which has been explained as being performed by the different apparatuses or devices, may be executed by one apparatus or device without causing any problem. In the computer system, it is possible to flexibly change the way of realization of the respective functions by means of any hardware configuration (server configuration).

The present disclosure can be also realized such that a computer program, in which the functions explained in the foregoing embodiments are packaged, is supplied to a computer, and the program is read and executed by one or more processors possessed by the computer. The computer program as described above may be provided for the computer by means of any non-transitory computer-readable storage medium capable of being connected to a system bus of the computer, or the computer program may be provided for the computer by the aid of a network. The non-transitory computer-readable storage medium includes, for example, disks of arbitrary types such as magnetic disk (floppy (registered trademark) disk, hard disk drive (HDD) and the like), optical disk (CD-ROM, DVD disk, Blu-ray Disc and the like) and the like, read only memory (ROM), random access memory (RAM), EPROM, EEPROM, magnetic card, flash memory, optical card, and media of arbitrary types suitable for storing electronic commands.

What is claimed is:

1. An information processing apparatus comprising a controller comprising at least one processor configured to:
   determine a safety score for each of a plurality of stores;
   extract at least one store from the plurality of stores, the extracted at least one store having a highest determined safety score,
      wherein the safety score for each store of the plurality of stores takes into consideration a degree of safety for a target vehicle visiting the store, the degree of safety for the target vehicle including at least one of a degree of safety of movement of a vehicle from a road to a parking place where a user parks to visit the store and a degree of safety of movement of the vehicle from the parking place to the road; and
   provide, to the user who gets on the target vehicle, a prompt to visit the extracted at least one store.

2. The information processing apparatus according to claim 1, wherein the controller extracts the at least one store in relation to the target vehicle existing in a predetermined geographical range.

3. The information processing apparatus according to claim 1, wherein the safety score is decided on the basis of a locational condition of each of the plurality of stores.

4. The information processing apparatus according to claim 3, wherein the controller corrects the safety score decided on the basis of the locational condition, on the basis of a position and a traveling direction of the target vehicle, and the controller extracts the at least one store on the basis of the corrected safety score.

5. The information processing apparatus according to claim 3, wherein the controller corrects the safety score decided on the basis of the locational condition, by using information which indicates avoidance by the user who is to visit the store and leave the store, and the controller extracts the at least one store on the basis of the corrected safety score.

6. An information processing method comprising allowing an information processing apparatus to:
   determine a safety score for each of a plurality of stores;
   extract at least one store from the plurality of stores, the extracted at least one store having a highest determined safety score,
      wherein the safety score for each store of the plurality of stores takes into consideration a degree of safety for a target vehicle visiting the store, the degree of safety for the target vehicle including at least one of a degree of safety of movement of a vehicle from a road to a parking place where a user parks to visit the store and a degree of safety of movement of the vehicle from the parking place to the road when the user leaves the store by the vehicle; and
   provide, to the user who gets on the target vehicle, a prompt to visit the extracted at least one store.

7. A non-transitory storage medium stored with a program for allowing a computer to execute:
   a step of determining a safety score for each of a plurality of stores;
   a step of extracting at least one store from the plurality of stores, the extracted at least one store having a highest determined safety score,
      wherein the safety score for each store of the plurality of stores takes into consideration a degree of safety for a target vehicle visiting the store, the degree of safety for the target vehicle including at least one of a degree of safety of movement of a vehicle from a road to a parking place where a user parks to visit the store and a degree of safety of movement of the vehicle from the parking place to the road when the user leaves the store by the vehicle; and
   a step of providing, to the user who gets on the target vehicle, a prompt to visit the extracted at least one store.

* * * * *